United States Patent
Li et al.

(10) Patent No.: US 9,588,988 B2
(45) Date of Patent: Mar. 7, 2017

(54) VISUAL INDICATORS FOR TEMPORAL CONTEXT ON MAPS

(71) Applicant: GOOGLE INC., Mountain View, CA (US)

(72) Inventors: Hongyi Li, San Francisco, CA (US); David Kosslyn, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 491 days.

(21) Appl. No.: 13/872,717

(22) Filed: Apr. 29, 2013

(65) Prior Publication Data
US 2015/0186415 A1 Jul. 2, 2015

Related U.S. Application Data

(60) Provisional application No. 61/789,823, filed on Mar. 15, 2013.

(51) Int. Cl.
G06F 17/30 (2006.01)
H04W 4/02 (2009.01)

(52) U.S. Cl.
CPC ........ *G06F 17/30241* (2013.01); *H04W 4/02* (2013.01)

(58) Field of Classification Search
None
See application file for complete search history.

(56) References Cited

U.S. PATENT DOCUMENTS

| | | |
|---|---|---|
| 6,278,943 B1 | 8/2001 | Yamauchi |
| 7,385,501 B2 | 6/2008 | Miller et al. |
| 7,546,206 B1 | 6/2009 | Miller et al. |

(Continued)

FOREIGN PATENT DOCUMENTS

WO WO-2012/089260 A1 7/2012

OTHER PUBLICATIONS

Microformats, "hCalendar 1.0," (2013). Retrieved from the Internet on Jul. 22, 2013: URL:http://microformats.org/wiki/hcalendar.

(Continued)

*Primary Examiner* — Anh Tai Tran
(74) *Attorney, Agent, or Firm* — Marshall, Gerstein & Borun LLP

(57) ABSTRACT

Client-side and server-side methods for displaying event data within a map that is displayed on a computing device are presented. In an example, the method includes receiving a request for mapping data including a request location defining a current geographic location of the client computing device, determining a request time corresponding to the request, the request time based on a time the mapping data request was sent by the client computing device. The method also includes retrieving mapping data corresponding to the request location and determining that an event in an event database includes an event time that occurs within a threshold time of the request time. The method further includes retrieving event data corresponding to the event that occurs within the threshold time of the request time and sending the retrieved mapping data and the retrieved event data to the client computing device in response to the request.

18 Claims, 6 Drawing Sheets

(56) References Cited

U.S. PATENT DOCUMENTS

| | | |
|---|---|---|
| 8,024,111 B1 | 9/2011 | Meadows et al. |
| 8,073,565 B2 | 12/2011 | Johnson |
| 8,090,532 B2 | 1/2012 | Tashev et al. |
| 8,103,445 B2 | 1/2012 | Smith et al. |
| 8,126,903 B2 | 2/2012 | Lehmann et al. |
| 8,296,266 B2 | 10/2012 | Lehmann et al. |
| 8,352,303 B2 | 1/2013 | Lehmann et al. |
| 8,543,441 B2 | 9/2013 | Siegel |
| 8,583,668 B2 | 11/2013 | Higgins et al. |
| 8,606,517 B1 | 12/2013 | Ehrlacher et al. |
| 8,612,134 B2 | 12/2013 | Zheng et al. |
| 8,645,181 B2 | 2/2014 | Lehmann et al. |
| 8,706,401 B2 | 4/2014 | Lee |
| 8,719,094 B1 | 5/2014 | Klein et al. |
| 2002/0161517 A1 | 10/2002 | Yano et al. |
| 2003/0204474 A1 | 10/2003 | Capek et al. |
| 2007/0174770 A1 | 7/2007 | Safoutin |
| 2008/0167937 A1 | 7/2008 | Coughlin et al. |
| 2008/0255759 A1 | 10/2008 | Abhyanker |
| 2009/0088962 A1 | 4/2009 | Jones |
| 2009/0112467 A1 | 4/2009 | Jiang et al. |
| 2010/0094678 A1 | 4/2010 | Gupta et al. |
| 2010/0111377 A1 | 5/2010 | Monroe |
| 2010/0123737 A1 | 5/2010 | Williamson et al. |
| 2010/0175001 A1 | 7/2010 | Lazarus et al. |
| 2010/0179750 A1 | 7/2010 | Gum |
| 2010/0274865 A1 | 10/2010 | Frazier et al. |
| 2010/0292921 A1 | 11/2010 | Zachariah et al. |
| 2011/0022304 A1 | 1/2011 | Lee |
| 2011/0125545 A1 | 5/2011 | Lehmann et al. |
| 2011/0130958 A1 | 6/2011 | Stahl et al. |
| 2011/0137929 A1 | 6/2011 | Lehmann et al. |
| 2011/0153629 A1 | 6/2011 | Lehmann et al. |
| 2011/0184943 A1 | 7/2011 | Norton et al. |
| 2011/0238457 A1 | 9/2011 | Mason et al. |
| 2011/0313657 A1 | 12/2011 | Myllymaki et al. |
| 2012/0158299 A1 | 6/2012 | Cerecke et al. |
| 2012/0203457 A1 | 8/2012 | Casey et al. |
| 2012/0253861 A1 | 10/2012 | Davidson et al. |
| 2012/0265433 A1 | 10/2012 | Viola et al. |
| 2012/0290967 A1 | 11/2012 | Scott et al. |
| 2013/0103450 A1 | 4/2013 | Lehmann et al. |
| 2013/0159051 A1* | 6/2013 | Timmons ............... 705/7.29 |
| 2013/0166385 A1* | 6/2013 | Russell ............ G06F 17/3087 705/14.58 |
| 2013/0218463 A1* | 8/2013 | Howard et al. ............ 701/533 |
| 2013/0246392 A1* | 9/2013 | Farmaner ........ G06F 17/30442 707/713 |
| 2013/0297551 A1 | 11/2013 | Smith et al. |
| 2013/0304349 A1 | 11/2013 | Davidson |
| 2014/0278056 A1* | 9/2014 | Williams et al. ............ 701/410 |

OTHER PUBLICATIONS

Rsoe, "Emergency and Disaster Information Service," (2004-2013). Retrieved from the Internet on Jul. 22, 2013: URL:http://hisz.rsoe.hu/alertmap/index2.php?lang=.

StackOverflow, "Real-Time Update to Markers in Google Maps," (2013). Retrieved from the Internet on Jul. 22, 2013: URL:http://stackoverflow.com/questions/12002269/real-time-update-of-markers-in-google-maps.

International Preliminary Report on Patentability for Application No. PCT/US2014/010436, dated Jul. 23, 2015.

International Search Report and Written Opinion for Application No. PCT/US2014/010436, dated Mar. 19, 2014.

Keyes, "This App Was Made for Walking—But Is It Racist?," NPR, 2013, 3 pages.

Night Blindness, HS98-136c (01-07), The Texas Department of Insurance, Division of Workers' Compensation. Retrieved from the Internet on Feb. 20, 2013: URL:http://web.archive.org/web/20130615034651/http://www.tdi.texas.gov/pubs/videoresource/t5nightblind.pdf.

U.S. Appl. No. 13/728,554, filed Dec. 27, 2012.

http://cdn.tripwiremagazine.com/wp-content/uploads/2011/05/yelp.jpg, archived May, 2011.

Screen Shot, tripwiremagazine.com/wp-content/uploads, Yelp, archived May, 2011.

* cited by examiner

VISUAL INDICATORS FOR TEMPORAL CONTEXT ON MAPS

CROSS-REFERENCE TO RELATED APPLICATION

The benefit under 35 U.S.C. §119(e) of U.S. Provisional Patent Application No. 61/789,850, filed Mar. 15, 2013, is hereby claimed, and the disclosure is incorporated herein by reference.

FIELD OF TECHNOLOGY

The present disclosure relates to displaying visual representations of temporal information on a map rendered by a mapping application running on a computing device and more specifically to a system and a method for building a database of event data from structured and unstructured Internet sources and displaying relevant event data on the map rendered by the mapping application running on the computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Software applications, including web browsers and mapping applications, may be used to view mapping data provided by network servers. For example, a mapping application may display mapping data, such as businesses, restaurants, etc. However, users are often interested in other data, such as weather data, event data, etc. Traditionally, in order for users to obtain temporal information data, such as events, weather, etc., the user would have to exit the mapping application and open a third party application, such as a web browser, to do a manual search for event information. Once the user finds an event, they have to re-enter the mapping application to search for location, directions, etc. This may negatively affect the user's experience, by having a user constantly switching between applications and interfaces, in order to find events, and then to determine if the event is located near them.

SUMMARY

In accordance with an embodiment of the present disclosure, a computer-implemented method may display real-time event data within a map on a client computing device. The method may receive, via a computer network, a request for mapping data including a request location defining a current geographic location of the client computing device. The method may also determine a request time corresponding to the request, the request time based on a time the mapping data request was sent by the client computing device. The event data may include structured data retrieved from Internet data sources. The mapping data may correspond to the request location. The method may also determine that an event in an event database includes an event time that occurs within a threshold time of the request time and retrieve, in response to determining that the event includes the event time within the threshold time of the request time, event data from the event database. The retrieved event data may correspond to the event that occurs within the threshold time of the request time. The method may further send, via the computer network, the retrieved mapping data and the retrieved event data to the client computing device in response to the request.

In accordance with another embodiment of the present disclosure, a computer-implemented method may display real-time event location within a map that is displayed on a client computing device. The method may send, via a computer network, a request for mapping data including a request location defining a current geographic location of the client computing device and a request time. The request time may include a time that the mapping data request is sent. The method may also receive, at the client computing device, mapping data and event data in response to the request for mapping data. The event data may define an event having an event time that occurs within a threshold time of the request time and the mapping data may correspond to the request location. The method may further display, at the client computing device, the received mapping data and event data within a viewport of a mapping application executing on the client computing device In accordance with another embodiment of the present disclosure, a computer system may display an event within visual proximity of a location on a digital map. An event data server may include one or more processors and a memory. The memory may include instructions for execution on the one or more processors to receive, via a computer network, a request for mapping data including a request location defining a current geographic location of the client computing device and determine a request time corresponding to the request, the request time based on a time the mapping data request was sent by the client computing device. The memory may also include instructions for execution on the processor to retrieve mapping data corresponding to the request location and determine that an event in an event database includes an event time that occurs within a threshold time of the request time. The memory may also include instructions for execution on the processor to retrieve, in response to determining that the event includes event time that occurs within the threshold time of the request time, event data from the event database, the retrieved event data corresponding to the event that occurs within the threshold time of the request time and send, via the computer network, the retrieved mapping data and the retrieved event data to the client computing device in response to the received request for mapping data.

In accordance with another embodiment of the present disclosure, another computer system may display an event within visual proximity of a location on a digital map. An event data server may include one or more processors and a memory. The memory may include instructions for execution on the one or more processors to send, via a computer network, a request for mapping data including a request location defining a current geographic location of the client computing device and a request time. The request time may include a time that the mapping data request is sent. The memory may also include instructions for execution on the processor to receive, at the client computing device, mapping data and event data in response to the request for mapping data. The event data may define an event having an event time that occurs within a threshold time of the request time, and the mapping data may correspond to the request location. The memory may also include instructions to display, at the client computing device, the received mapping data and event data within a viewport of a mapping application executing on the client computing device.

In accordance with an embodiment of the present disclosure, an apparatus may display real-time event data within a map on a client computing device. The apparatus may include receiving means to receive, via a computer network, a request for mapping data including a request location defining a current geographic location of the client computing device. Determining means may determine a request time corresponding to the request, the request time based on a time the mapping data request was sent by the client computing device. Retrieving means may retrieve mapping data corresponding to the request location. The determining means may determine that an event in an event database includes an event time that occurs within a threshold time of the request time. The retrieving means may retrieve, in response to determining that the event includes the event time within the threshold time of the request time, event data from the event database, the retrieved event data corresponding to the event that occurs within the threshold time of the request time. A sending means may send, via the computer network, the retrieved mapping data and the retrieved event data to the client computing device in response to the request.

In accordance with another embodiment of the present disclosure, another apparatus may display event location within a map that is displayed on a client computing device. Sending means may send, via a computer network, a request for mapping data including a request location defining a current geographic location of the client computing device and a request time, the request time including a time that the mapping data request is sent. Receiving means may receive, at the client computing device, receiving, at the client computing device, mapping data and event data in response to the request for mapping data, the event data defining an event having an event time that occurs within a threshold time of the request time, and the mapping data corresponding to the request location. Display means may also display, at the client computing device, at the client computing device, the received mapping data and event data within a viewport of a mapping application executing on the client computing device.

The features and advantages described in this summary and the following detailed description are not all-inclusive. Many additional features and advantages will be apparent to one of ordinary skill in the art in view of the drawings, specification, and claims hereof.

The figures depict one embodiment of the present invention for purposes of illustration only. One skilled in the art will readily recognize for the following discussion that alternate embodiments of the structures and methods illustrated herein may be employed without departing from the principles of the invention described herein.

DETAILED DESCRIPTION

Figure 1A:
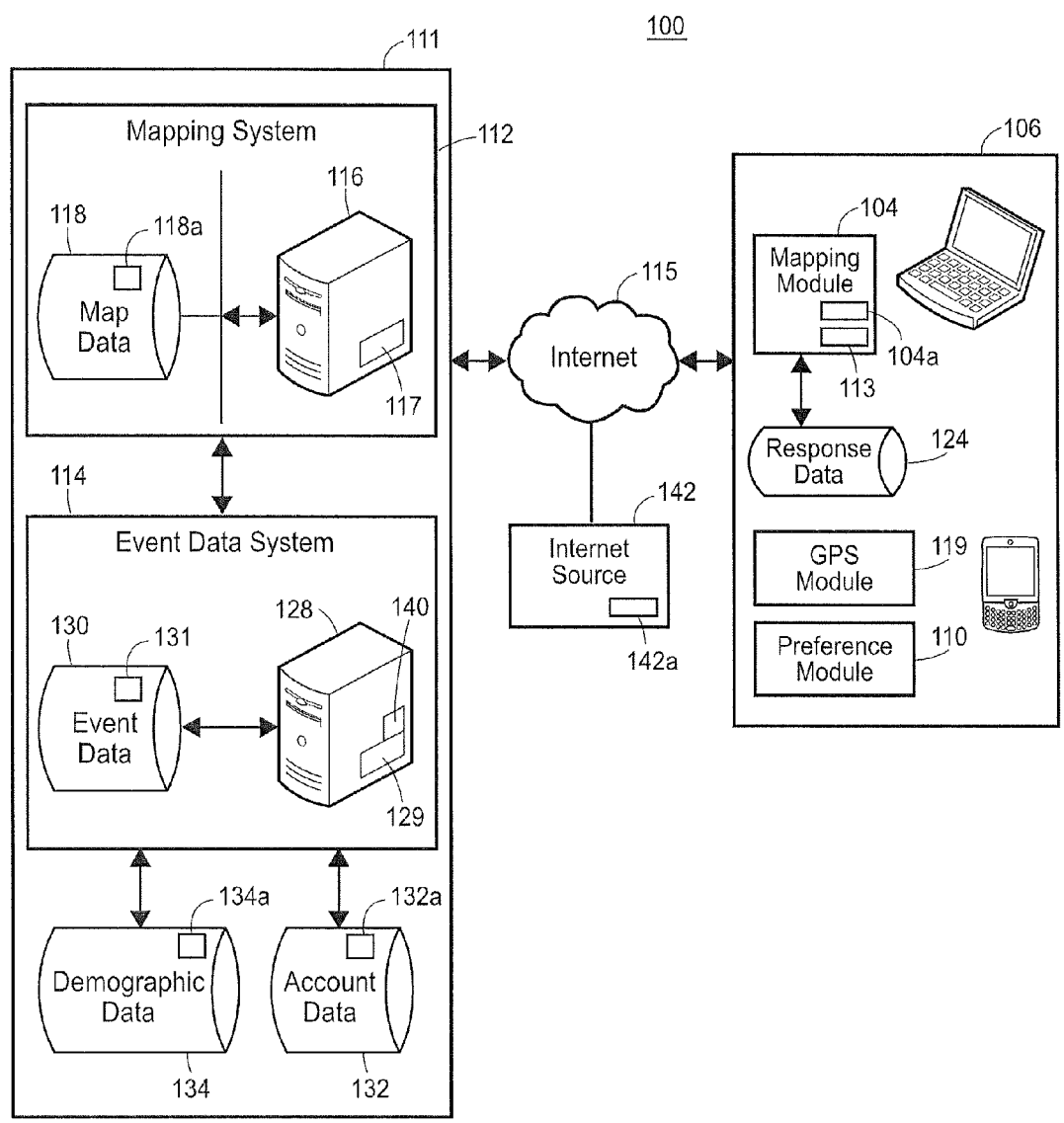
FIG. 1A is a high-level block diagram of a system for structuring event data and transmitting event data in a mapping system.

FIG. 1 is a high-level block diagram that illustrates a system 100 for structuring event data from structured and unstructured internet sources and transmitting mapping data and event data to a computing device in response to a mapping data request. The system 100 may include a computing device 106 that is capable of executing the mapping module 104, an account preference module 110 and other modules that may allow the device 106 to receive event data 131 from a mapping server 116 and/or an event data server 128. In some embodiments, the computing device 106 executes instructions of the mapping module 104 and the account preference module 110. The device 106 may be a personal computer, smart phone, tablet computer, head mounted display (HMD), smart watch, or other computing device capable of executing the various modules, instructions, etc., described herein. The mapping module 104 and preference module 110 may communicate with backend components 111, including a mapping system 112 and an event data system 114, through the Internet 115 or other type of network (e.g., LAN, a MAN, a WAN, a mobile, a wired or wireless network, a private network, or a virtual private network, etc.).

In some embodiments, the mapping module 104 and preference module 110 may send data to the backend components 111. For example, the mapping module 104 may transmit one or more requests 113 for mapping data 118a and/or event data 131 corresponding to specified or user preferred geographic regions. A mapping system server 116 may send and receive data for the mapping module 104. In some embodiments, the mapping system 112 and mapping server 116 may send computer-executable instructions and data to allow the mapping module 104 to render a digital map in a display component of the computing device 106. For example, the mapping server 116 may include a module 117 to receive requests 113 including location data from the computing device 106, results of an analysis by the event data system 114, or other data and, in return, send mapping data 118a, stored in one or more data repositories, such as mapping database 118.

The mapping module 104 may include computer-executable instructions to allow the mapping module 104 to render a digital representation of a user's current geographic location or any other geographic location in a display component of the computing device 106. As part of the rendering process (e.g., when the user executes the mapping module 104, conducts a geographic location search using the mapping module 104, etc.), the mapping module 104 may execute instructions to display a mapping application 104a including mapping data 118 from the mapping system 112 and event data 131a from event data system 114. The mapping application 104a may allow a user to cause the device 106 to render various digital representations of geographic locations using mapping data 118a and/or event data 131a.

In some embodiments, the event data server 128 and/or mapping server 116 may access an account database 132 and/or a demographic database 134. The event data server 128 and/or mapping server 116 may execute instructions to access the account database 132 and/or demographic database using an account identifier 113*e* (FIG. 2C). The account database 132 may store account data 132*a* corresponding to an account. The demographic database 134 may store demographic data 134*a* corresponding to an account. Account data 132*a* and/or demographic data 134*a* may generally include a history of web browser searches, trips planned via a trip planning application executing on the device 106, e-mail data, social networking data, or other data that may include indications of geographical locations the account has specified (e.g., a current or future location, a planned location, location preferences, etc.), a log of web page requests, locations, flight information, e-mail discussions, and social networking profile information.

In situations in which the systems discussed herein collect personal information about users, or may make use of personal information, the users may be provided with an opportunity to control whether programs or features collect user information (e.g., information about a user's social network, social actions or activities, a user's preferences, or a user's current location). In addition, one or more servers may execute an instruction to treat certain data in one or more ways before it is stored or used and remove any personally identifiable information.

The event data system 114 may include an event data system server 128 at the backend 111 that includes an event module 129 to receive, send, and analyze account data 132*a* and/or demographic data 134*a* for determining relevant event data 131 to be transmitted to the computing device 106 using the mapping module 104. Event data 131 may include public or private events, news event, performances, a sales event, a temporal business event (i.e. hours of operation, special activities, product demonstrations), weather condition, hazard condition (such as information about natural disasters, power outages, disease outbreaks, etc.) or any other temporal information. In some embodiments, the event database 130 may include events retrieved from one or more user profiles linked to a social networking account associated with the device identifier.

The event data system 114 may include an event data server 128 at the backend 111 that includes a module 129 to receive, send, and analyze event data 131 that may be transmitted to the computing device 106. The event data server 128 may execute an instruction to store the event data 131 in the event database 130. Module 129 may include computer-executable instructions to analyze the event data 131 stored in the event database 130. Analysis of the event data 131 by the module 129 may include computer-executable instructions to determine event data 131 that the event data server 128 may send to the mapping system 112 or computing device 106.

In still other embodiments, the event data system 114 may include an event data server 128 at the backend 111 that includes a retrieval module 140 to retrieve event data from one or more Internet sources 142 accessed over the internet 115. These sources may include web pages, RSS feeds, social media pages, etc. In some embodiments, the server 128 stores the event data 131 in the event database 130. Module 140 may include computer-executable instructions to analyze the data stored in the event database 130.

Figures 2, 2A:
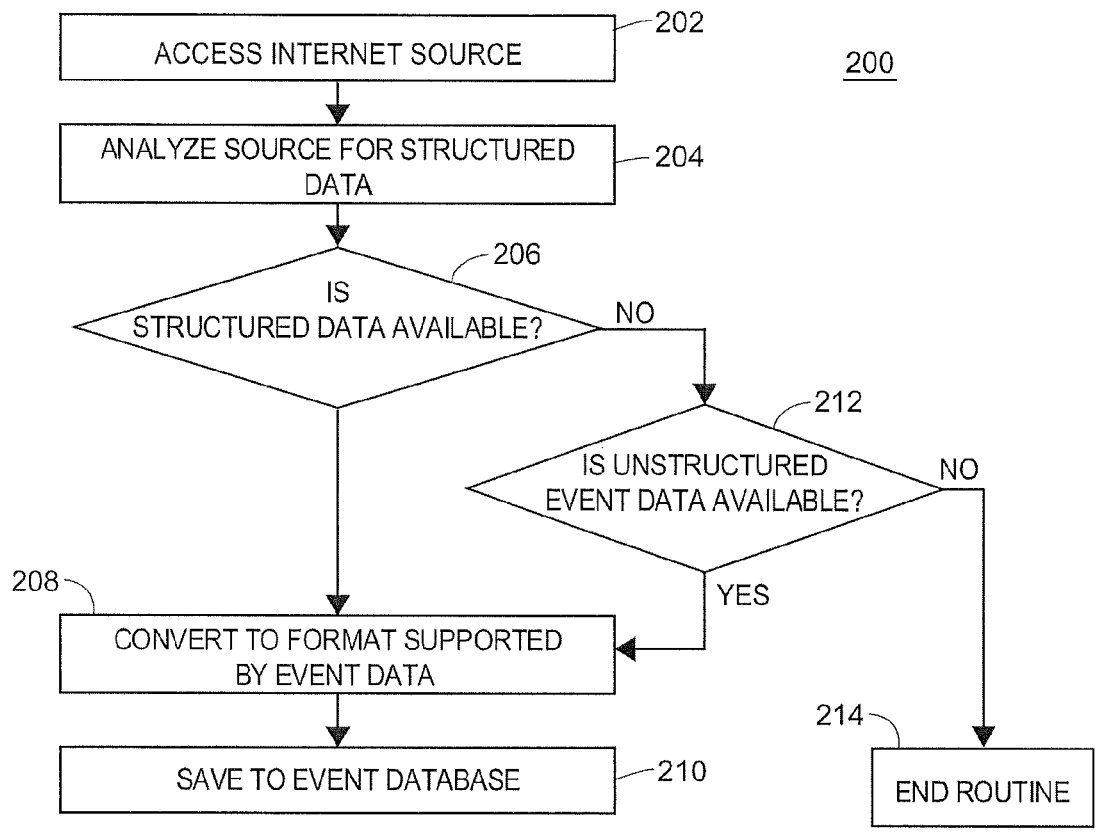
FIG. 2 is an exemplary flow chart of one method to create a structured event database for a mapping system according to an embodiment described herein.
FIG. 2A is an exemplary data structure for a map data request.

FIG. 2 illustrates a process flow diagram or flow chart of a method, routine, or process 200 that may be used to retrieve event data from one or more structured or unstructured internet sources and create a structured event database, according to an embodiment. At block 202, the processor of the event data server 128 may execute an instruction to access an Internet source 142, such as a web page, a Really Simple Syndication (RSS) feed, a social network page, etc. In some embodiments (not shown), the processor may also execute an instruction to periodically analyze one or more Internet sources 142 and send results to a local or remote data systems, such as the event data system 114 illustrated in FIG. 1, via a network connection. In some embodiments, the owner of the Internet source 142 may be provided with an opportunity to control whether programs or features collect event information. Additionally, the user of any social networking service may be provided with an opportunity to control whether programs or features collect event information or user information (e.g., information about a user's social network, social actions or activities, profession, a user's preferences, or a user's current location). The event data server 128 may also execute an instruction to treat certain data in one or more ways and remove personally identifiable information.

At block 204, the processor of the event data server 128 may execute an instruction to analyze the Internet source 142, including the page source, source code, web code, etc., and determine if the Internet source contains any structured event data describing an event. For example, the internet source 142 may include a data structure in one or more formats. FIG. 2A illustrates an example data structure 250 of event data 131 which may be part of an Internet source 142. The data structure 250 may be in a format such as the hCalandar microformat, as shown in Table 1, below.

TABLE 1

```
<span class="vevent">
<span class="summary">Fiesta Concert</span>
 on <span class="dtstart">2012-03-04</span>
from <span class="value">8:30am</span> <abbr class="value" title="0500">EST</abbr>
 </span> until
<span class="dtend">
  <span class="value">9:30am</span>     abbr class="value" title="-0500">EST</abbr>
</span>
at the Rose Gallery
in <span class="location">Chicago, IL, USA</span>.
</span>                                    > <
```

The data structure 250 may include a data type 250*a*, an event name 250*b*, an event summary 250*c*, an event date 250*d*, an event start time 250*e*, an event end time 250*f*, an event venue name 250*g*, an event location 250*h* and other data 250*i*. A processor of a server, such as the processor 140 of the event server 128 illustrated in FIG. 1, may execute an instruction to parse a code segment, such as the hCalendar microformat data structure of Table 1, and extract the data type 250*a*, the event name 250*b*, the event summary 250*c*, the event date 250*d*, the event start time 250*e*, the event end time 250*f*, the event venue name 250*g*, the event location 250*h* and the event location 250*i*. The processor may also execute an instruction to save the data type 250*a*, the event name 250*b*, the event summary 250*c*, the event date 250*d*, the event start time 250*e*, the event end time 250*f*, the event venue name 250*g*, the event location 250*h* and the event location 250*i* in the event database 130 illustrated in FIG. 1. Although FIG. 2A is described in reference to an hCalendar microformat data structure, the data structure 143 may be in one or more other formats such as ContextObjects in Spans (COinS), Embedded RDF, Gleaning Resource Descriptions from Dialects of Languages (GRDDL), Microdata, Resource Description Framework-in-attributes (RDFa), Simple HTML Ontology Extensions, a metadata tag, XHTML Meta Data Profiles, etc.

If, at block 206, the processor executing the instructions determines that structured event data is available (i.e., YES branch of block 206), at block 208, the processor may also execute an instruction to retrieve the structured event data and convert the structured event data into a data format supported by the event database 130. At block 210, the processor may also execute an instruction to save the event data 131 to one or more data repositories, such as the event database 130. In some embodiments, the processor of the event data server 128 may execute an instruction to save the structured event data to the event database 130 at some other block in the method 200, for example, before the structured event data has been converted to a format supported by the event database 130.

In some embodiments, the processor may execute an instruction to periodically analyze one or more Internet sources 142 and send results to a local or remote event data system 114 via a network connection. The processor of the event data server 128 may execute one or more computer-executable instructions to parse the structured event data to identify or determine event data 130, including event location data, event name data, event description data, event date data and/or other event data from the structured event data. The event location data may include a city name, an address, a zip code, GPS coordinates or any other information indicating a geographic location.

Figure 3:
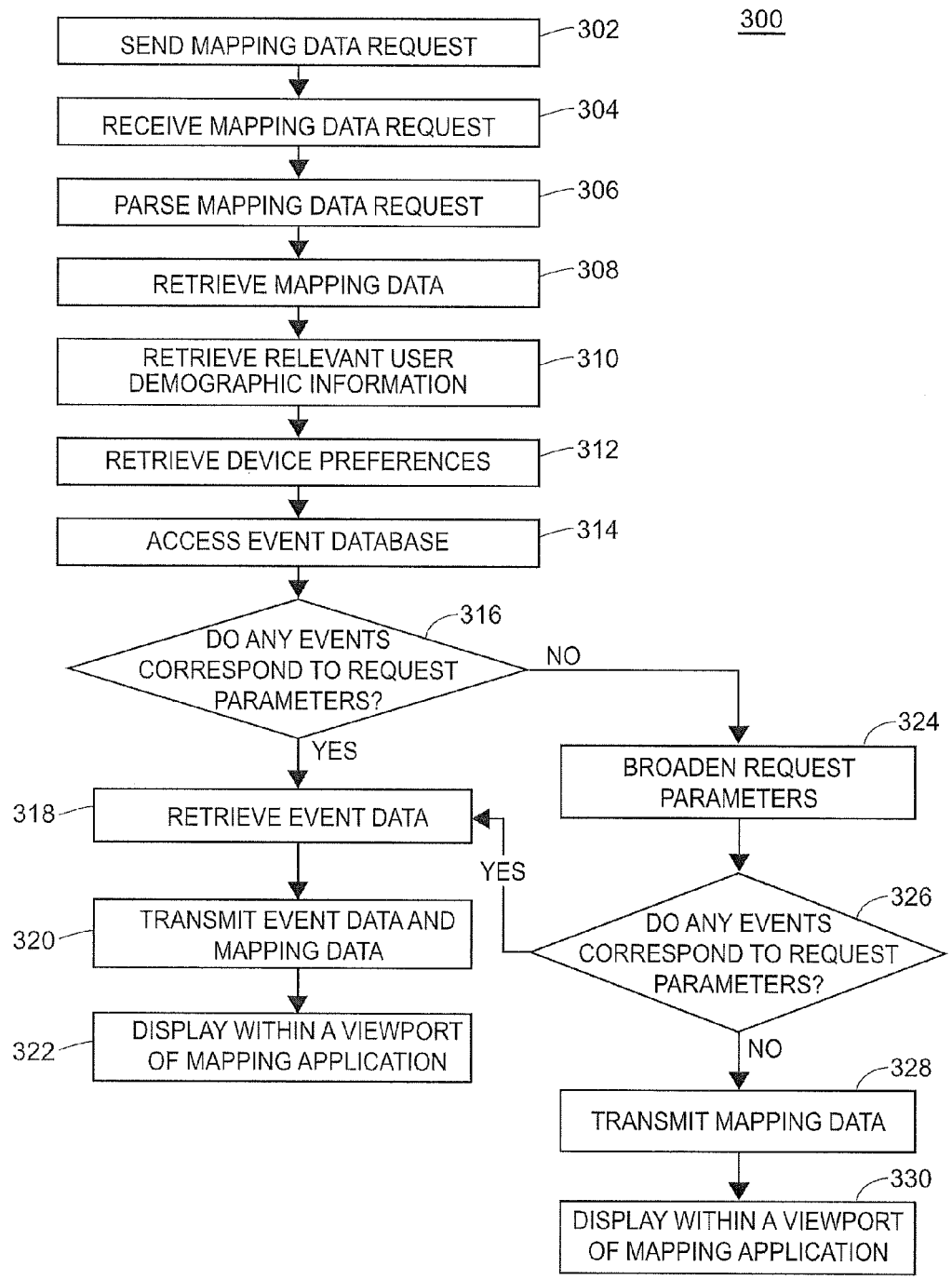
FIG. 3 is an exemplary flow chart of one method to retrieve mapping data and event data in a mapping system according to an embodiment described herein.
Figure 3A:
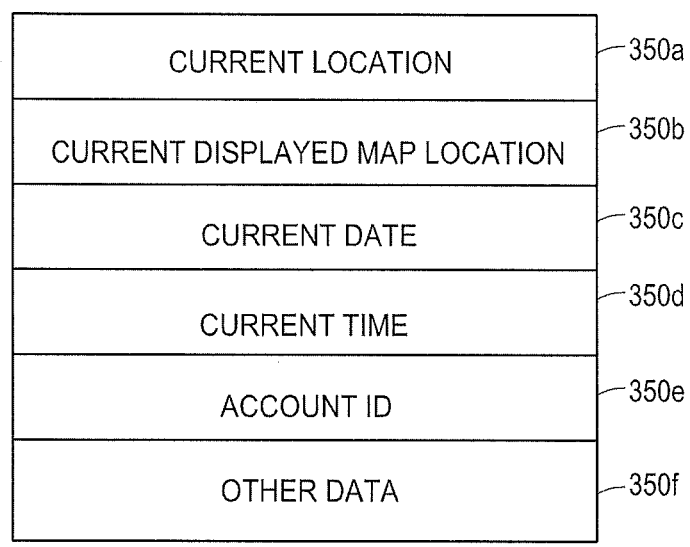
FIG. 3A is an exemplary data structure for event data retrieved from an internet source.

If, at block 206, the processor executing the instruction determines that no structured event data is available (i.e., the NO branch of block 206), then at block 212, the event data server 128 may execute an instruction to analyze the Internet source 142 to determine if the internet source 142 contains any unstructured event data defining an event. If, at block 212, the processor executing the instructions determines that there is no unstructured event data available (i.e., the NO branch of block 212), then, at block 214, the event data server 128 may execute an instruction to end the method 200. If, at block 212, the processor executing the instructions determines there is unstructured event data available (i.e., the YES branch of 212), then, at block 208, the event data server may execute an instruction to retrieve the unstructured event data and convert the unstructured event data into a data format supported by the event database 130. The unstructured event data may include an event name, an event summary, an event date, an event start time, an event end time, an event venue name, an event location and other data that is similar to the structured event data. At block 210, the processor of the event data server may also execute an instruction to save the unstructured event data to the event database 130. In some embodiments, the processor may execute an instruction to save the event data 131 to the event database 130 at any other block in the method 200, for example, before the data has been converted to a format supported by the database FIG. 3 illustrates a process flow diagram or flow chart of a method, routine, or process 300 that may be used to retrieve mapping data and event data according to an embodiment and transmit response data 124 to the computing device 106. Turning again to FIG. 3, at block 302, a processor of the computing device 106 may execute an instruction stored in memory to send a request 350 to mapping server 116. With reference to FIG. 3A, the request 350 may correspond to a data structure including a single electronic message or a series of electronic messages, depending on the scenario and/or embodiment. While the request 350 of FIG. 3A illustrates several types of data, the systems and methods described herein may use all or only some of the types of data. In some embodiments, the request 350 may include current location data 350a, currently displayed map location data 350b, current date 350c, current time 350d, an account identification 350e, and other data 350f. The current location data 350a may be retrieved or received from a GPS module 119 of the client computing device 106. The currently displayed map location data 350b may include coordinates corresponding to a geographic location that is represented in a mapping application 104a executed by the client computing device 106. The current time data 350c may include the time that the client computing device 110a sent the map request. In some embodiments, the processor of the client computing device may determine the time that the request 350c is being sent and include the determined time as current time data 350c. The request 350 may also include other data 350e. At block 304, the mapping server 116 may receive the request 350.

At block 306, a processor of the mapping server 116 may execute an instruction to parse the request 350 to extract the request parameters and at block 308 the mapping server 116 may execute an instruction to access a map database 118 and retrieve map data 118a corresponding to the request parameters. For example, in reference to the map 404 illustrated in FIG. 4, the request 350 may define a current location 350a as the 60661 zip code, a current date 350c as Aug. 18, 2012 and a current time 350d as 4:00 PM. In some embodiments, the processor of the mapping server may determine the current time 350d based on the time that the request 350c was sent by the client computing device. In some embodiments, the process of the mapping server may determine the current time 350d, based n the time that the request 350c is received by the mapping server 116.

At block 310, the processor of the mapping server 116 (FIG. 1) may also execute an instruction to access a demographic database (such as the demographic database 134 illustrated in FIG. 1) and retrieve any relevant demographic data 134a. At block 312, the mapping server 116 may execute an instruction to access an account database 132 and retrieve one or more preferences associated with the account identifier 350e. A mapping module 104 executed by the processor of the computing device 106 may provide a user interface to control whether programs or features collect user information (e.g., information about a user's social network, social actions or activities, profession, a user's preferences, or a user's current location), or to control whether and/or how to receive content from the content server that may be more relevant to the user. In addition, the processor may execute an instruction to treat or modify any data in one or more ways and remove any personally identifiable information. At block 314, the processor may execute an instruction to access an event database (such as the event database 130 illustrated in FIG. 1).

At block 316, the processor of the map server 116 may execute an instruction to determine whether one or more events in the event database correspond to the parameters (i.e., the request parameters, the user demographic information and/or the device parameters). If, at block 316, the processor executing the instruction determines that one or more event data 250 in the event database 130 correspond to the request parameters (i.e., the YES branch of block 316), then, at block 318, the processor of the mapping server 116 may execute an instruction to retrieve the corresponding event data 250 from the event database 130. For example, the processor executing the instruction may determine one or more events 250 (FIG. 2A) that correspond to the current location 350a, current date 350c, and current time 350c corresponding to the request parameters (i.e., two concerts, a rock concert and a classical concert playing at venues in the 60661 area code on Aug. 18, 2012 at 4:00 PM). In some embodiments, other event data may be retrieved including temporal information concerning business (i.e. hours of operation, special activities), weather information, hazard information (such as information about natural disasters, power outages, disease outbreaks, etc.) or any other temporal information.

In some embodiments, the mapping server 116 may also execute an instruction to use an account identifier 350e to access account database 132 and/or demographic data 134. The account database 132 may include account data 132a that, when interpreted by an instruction executed by the mapping server 116 may indicate a preference for rock music and a dislike for classical music. The processor of the mapping server 116 may execute an instruction to query an event database 130 and determine one or more rock concert event data corresponding to the request data 124 and transmit the event data 250 to the client device 106.

In some embodiments, the processor of the mapping server 116 may also execute an instruction to access a demographic database 134 and retrieve demographic information 134a associated with the account identification 350e. For example, the instruction executed by the processor of the mapping server 116 may interpret the demographic information 134a to indicate a correlation between rock concerts and sushi restaurants. The processor of the mapping server 116 may execute an instruction to query an event database 130 and may determine that event data 250 and mapping data 118a correspond to a Japanese food festival in the area code 60661 on Aug. 18, 2012 at 4:15 PM. In some embodiments, the event data 250 may also indicate that one or more user profiles linked to the social networking account associated with the account identifier 350e is associated with the event data 250 (for example, if the user promoted, created, or indicated they will be attending the event). The processor of the mapping server 116 may also execute an instruction to determine if one or more event data 250 in the event database 130 are associated with a contact linked to the account identifier 350e.

Figure 4:
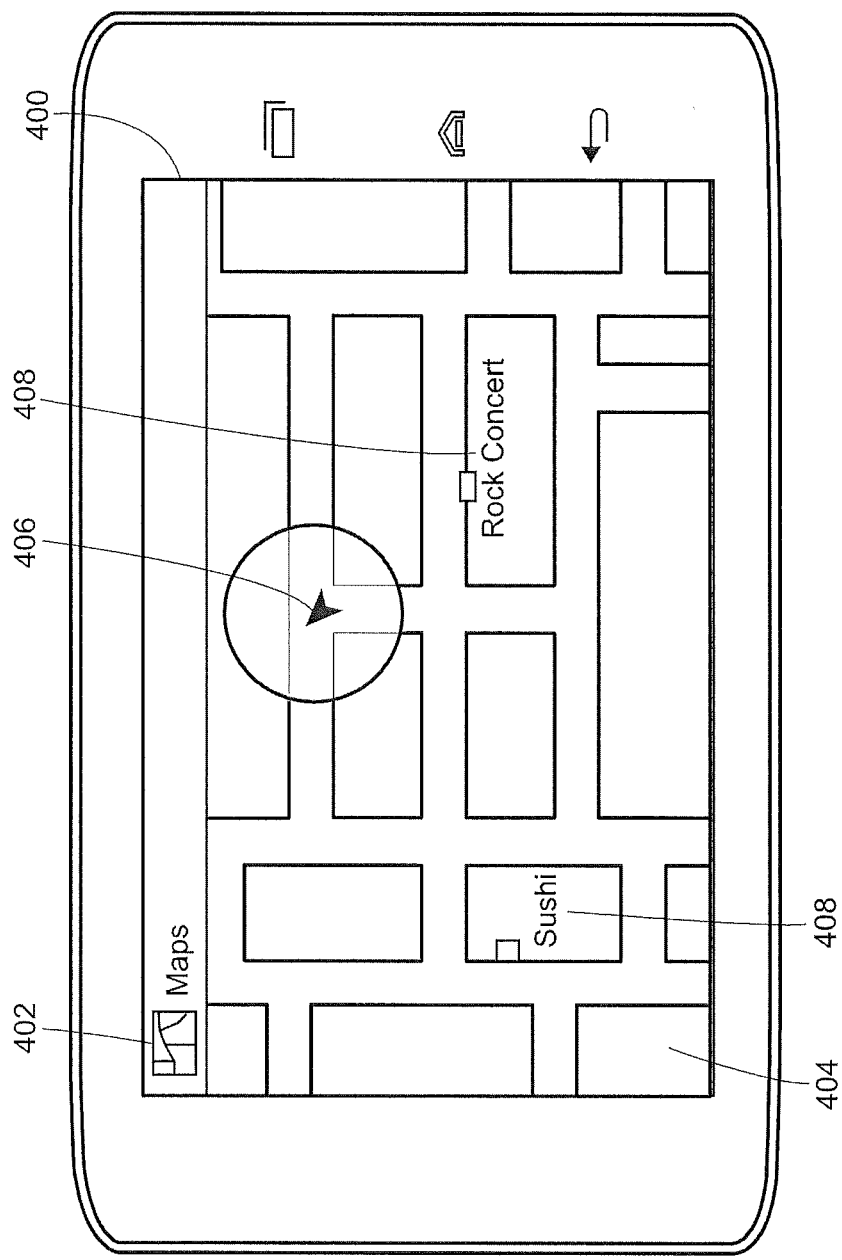
FIG. 4 illustrates a mapping application running on a client computing device in which a map may be rendered containing visual representations of event data based on time.

At block 320, the processor may execute an instruction to transmit a response data 124 (including the event data 250 and the map data 118a) to the computing device 106. At block 322, the processor of the computing device 106 may execute an instruction to extract the mapping data 118a and event data 250 from the response data 124. Turning to FIG. 4, block 322 may cause the processor of the computing device 106 to execute an instruction to use the received mapping data 118a to render and display a map 404, a visual representation 406 of the client device 106a location on the map 404 as well as one or more visual representations of event data 408. FIG. 4 illustrates a client device 106 with a processor that may execute a mapping application 104a and may execute an instruction implementing the method 300 to receive response data 124 and to render a map 404 within a viewport of a display 400 of the client device 106. Though the display 400 of client device 106 of FIG. 4 is depicted as the display of a cell phone, the system 100 and method 300 may be implemented on any computing device, including cell phones, tablets, computers, watches, head mounted displays, etc.

The processor of the computing device 106 may execute an instruction to transmit a request 350 for mapping data 118a (using, for example, the method 200 illustrated in FIG. 2) and a mapping server 116 may transmit response data 124, including mapping data 118a and event data 250, to the client device 106. The processor may also execute an instruction to render visual representations of the event data 408 as a layer on the map 404, as a label on a map 404, may render the event data 408 directly on the map 404, etc.

In some embodiments, the processor of the client device 106 and/or the mapping server 116 may execute an instruction to rank two or more event data 250 based on a difference of an event start time 250e and/or event end time 250f to the current time parameter 350d. The event data 250 that have a smaller difference from the current time parameter 350d may be ranked higher and displayed differently (e.g., emphasized) over other event data displayed on the device 106.

If, at block 316, the processor executing the instruction determines that no event data 250 in the event database 130 correspond to the request parameters (i.e., the NO branch of block 316), then, at block 324 the mapping server may execute an instruction to broaden the parameters. At block 326, the processor of the mapping server 116 may also execute an instruction to determine if one or more event data 250 in the event database 130 meet the broadened parameters. For example, the original request parameters may indicate that the client device is in the area code 60661, that the date is Aug. 18, 3012 and that the time is 4:00 PM. The processor may execute an instruction to broaden the parameters to include events in the area code 60660 and events that start between 3:00 PM and 9:00 PM. If, at block 318, the processor executing the instruction determines that one or more event data 250 in the event database 130 meet the broadened parameters, (i.e., YES branch of block 318) the processor may execute an instruction to retrieve the corresponding event data 250 from the event database 130. At block 320, the processor of the mapping server 116 may execute an instruction to transmit a response data 124 (including the event data 250 and the mapping data 118a to the computing device 106). At block 322, a processor of the computing device 106 may execute an instruction to extract the mapping data 118a and event data 250 from the response data 124 and use the mapping data 118a to render and display a map 404 with event data 250 within a viewport of a mapping application 104a.

If, at block 326, the processor executing the instructions determines that no event data 250 in the event database 130 correspond to the broadened parameters (i.e., the NO branch of block 326), then the processor of the mapping server 116 may execute an instruction to transmit mapping data 118a to the first device (block 328). At block 330, a processor of the computing device 106 may execute an instruction to use the mapping data 118a to render and display a map 404 within a viewport of the mapping application 104a executed by the processor of the computing device 106. In some embodiments the mapping server 116 may execute one or more instructions to broaden the parameters one or more times and determine if one or more event data 250 meet the broadened parameters.

Figure 5:
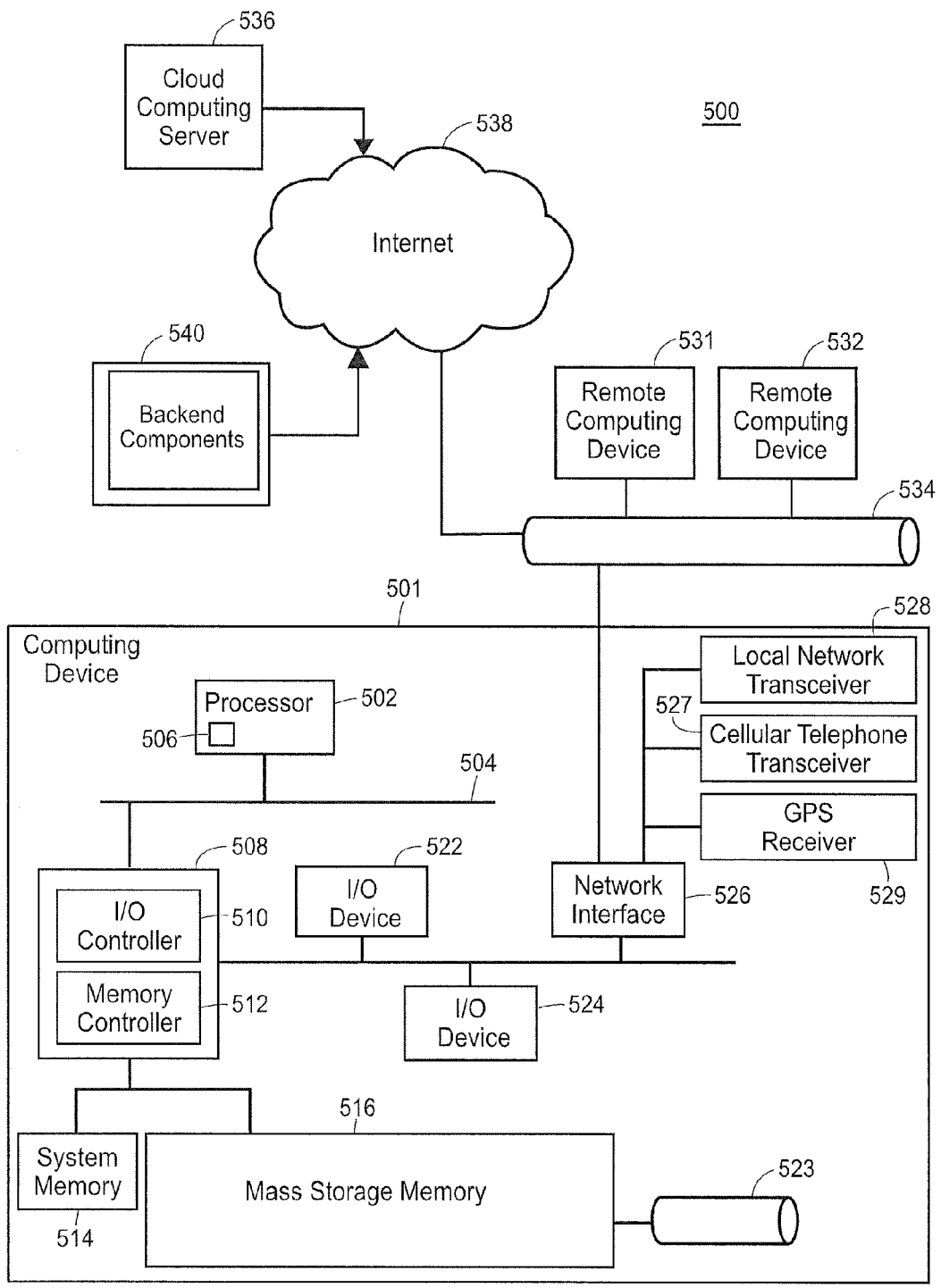
FIG. 5 is high-level block diagram of a computing environment that implements a system structuring event data and transmitting event data in a mapping system.

FIG. 5 is a high-level block diagram of an example computing environment for a mapping system 500 having a computing device 501 that may be used to implement the system 100 for structuring event data 131 from structured and non-structured Internet sources 142 and transmitting event data 131. The computing device 501 may include a mobile device (e.g., a cellular phone, a tablet computer, a smart watch, a head mounted display, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example mobile mapping system 500 may be used to implement and execute the example system of FIG. 1, the methods of FIGS. 2 and 3, analyze the data structures of FIG. 2A, 3A, etc. Although the example mobile mapping system 500 is described below as including a plurality of peripherals, interfaces, chips, memories, etc., one or more of those elements may be omitted from other example processor systems used to implement and execute the example system 100 to structure event data and transmit event data to the computing device 501. Also, other components may be added.

As shown in FIG. 5, the computing device 501 includes a processor 502 that is coupled to an interconnection bus 504. The processor 502 includes a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the computing device 501 may be a multi-processor device and, thus, may include one or more additional processors that are identical or similar to the processor 502 and that are communicatively coupled to the interconnection bus 504.

The processor 502 of FIG. 5 is coupled to a chipset 508, which includes a memory controller 512 and a peripheral input/output (I/O) controller 510. As is well known, a chipset typically provides I/O and memory management functions as well as a plurality of general purpose and/or special purpose registers, timers, etc. that are accessible or used by one or more processors coupled to the chipset 508. The memory controller 512 performs functions that enable the processor 502 (or processors if there are multiple processors) to access a system memory 514 and a mass storage memory 516.

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device. For example, if the computing device 501 is used to implement one or more modules (including instructions implementing the methods illustrated in the methods 200 of FIG. 2 and the method 300 of FIG. 3), the mass storage memory 516 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 501 and the mobile mapping system 500. Thus, a module, block, function, operation, procedure, routine, step, and method can be implemented in hardware, firmware, and/or software. In one embodiment, program modules and routines (e.g., the event module 518, the mapping application 520, the preference module 521, etc.) are stored in mass storage memory 516, loaded into system memory 514, and executed by a processor 502 or can be provided from computer program products that are stored in tangible computer-readable storage mediums (e.g. RAM, hard disk, optical/magnetic media, etc.).

Mass storage 516 may also include a database 523 storing GPS data, graphics, mapping data, event data, account data, demographic data, and other data for use by the mapping module 518, mapping application 520 and the preference module 521 as well as a database interface module through which the mapping module 518, the mapping application 520 and the preference module 521, etc., may access the GPS data, graphics, etc. received from a mapping data system 112, event data system 114, or other data system.

The peripheral I/O controller 510 performs functions that enable the processor 502 to communicate with peripheral input/output (I/O) devices 522 and 524, a network interface 526, a cellular network transceiver 527, a local network transceiver 528, and a GPS receiver 529 (via the network interface 526) via a peripheral I/O bus 530. The I/O devices 522 and 524 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, a touch screen, an eye tracker, a voice recognition module, etc.), etc. The I/O devices 522 and 524 may be used with the mapping module 518, mapping application 520 and the preference module 521, etc. to receive GPS data from the GPS receiver 529, send the GPS data to the backend components of the system 100, render, and display maps and user interfaces as described in relation to the figures. A cellular network transceiver 527 may be resident with the local network transceiver 528. The local network transceiver 528 may include support for a Wi-Fi network, Bluetooth, Infrared, or other wireless data transmission protocols. In other embodiments, one element may simultaneously support each of the various wireless protocols employed by the computing device 501. For example, a software-defined radio may be able to support multiple protocols via downloadable instructions.

In operation, the computing device 501 may be able to periodically poll for visible wireless network transmitters (both cellular and local network) on a periodic basis. Such polling may be possible even while normal wireless traffic is being supported on the computing device 501. The network interface 526 may be, for example, an Ethernet device, an asynchronous transfer mode (ATM) device, an 802.11 wireless interface device, a DSL modem, a cable modem, a cellular modem, etc., that enables the system 100 to retrieve mapping data and event data to communicate with another computer system having at least the elements described in relation to the system 100.

While the memory controller 512 and the I/O controller 510 are depicted in FIG. 5 as separate functional blocks within the chipset 508, the functions performed by these blocks may be integrated within a single integrated circuit or may be implemented using two or more separate integrated circuits. The remote computing devices 530 and 532 may communicate with the computing device 501 over a network link 534. For example, the computing device 501 may receive mapping data created by a mapping application executing on a remote computing device 531, 532. In some embodiments, data and or computer readable instructions may be retrieved by the computing device 501 from a cloud computing server 536 via the Internet 538.

Using the systems and procedures described above, the system 100 structuring event data 131 from structured and non-structured Internet sources 142 and transmitting event data 131 and mapping system 500 can retrieve and analyze data from a computing device that indicates a geographic location. For Internet-based device preferences, a browser history or other data may be parsed to determine device preferences. Similarly, local application data indicating trip planning or other location-based activities may be stored at the mobile device, forwarded to an event data system or other system, and used by a mapping system to provide locations for relevant even data. The systems described herein may present a user with a user interface from which the user is able to opt-out of any of the pre-fetching methods described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the system 500 may include but is not limited to any combination of a LAN, a MAN, a WAN, a mobile, a wired or wireless network, a private network, or a virtual private network. Moreover, while only two remote computing devices 531 and 532 are illustrated in FIG. 5 to simplify and clarify the description, it is understood that any number of client computers are supported and can be in communication within the system 500. Additionally, certain embodiments are described herein as including logic or a number of components, modules, or mechanisms. Modules may constitute either software modules (e.g., code embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 200 and 300 may include one or more function blocks, modules, individual functions or routines in the form of tangible computer-executable instructions that are stored in a non-transitory computer-readable storage medium and executed using a processor of a computing device (e.g., a smart phone, tablet computer, or a mobile computing device, or other personal computing device, as described herein). The methods 200 and 300 may be included as part of any backend 111 or client mobile computing device 106 modules of a computing environment for a system 100 for structuring and transmitting event data, for example, or as part of a module that is external to such a system. For example, the methods may be part of an event data module 129, event retrieval module 140, mapping module 117, mapping module 104, etc. executing within an application on a computing device of a system 100 for structuring and transmitting event data 102a. Though the figures may be described with reference to the other figures for ease of explanation, the methods 200 and 300 can be utilized with other objects and user interfaces. Furthermore, although the explanation above describes steps of the methods 200 and 300 being performed by specific devices (such as a computing device 106 and a mapping system server 116), this is done for illustration purposes only. The blocks of the methods 200 and 300 may be performed by one or more devices or other parts of the system 100, such as the computing device 106, mapping server 116 and/or event server 128.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict some embodiments of the system 100 structuring event data 131 from structured and non-structured Internet sources 142 and transmitting event data 131 and mapping system 600 in a mapping system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the system 100 structuring event data 131 from structured and non-structured Internet sources 142 and transmitting event data 131 and mapping system 600. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for displaying real-time event data within a map, the method comprising:
receiving, via a computer network, a request for mapping data including a request location defining a current geographic location of the client computing device;
determining a request time corresponding to the request, the request time based on a time the mapping data request was sent by the client computing device;
retrieving mapping data for generating a digital map corresponding to the request location;

identifying, within an event database that stores event start times and event end times for events, a plurality of events with event times delimited by corresponding start times and end times, that occur within a threshold time of the request time;

for each of the plurality of identified events, retrieving event data for the corresponding events from the event database;

sending, via the computer network, the retrieved mapping data and the retrieved event data to the client computing device in response to the request; and causing the client computing device to display indicators for the identified events on the digital map differently depending on the proximity of the corresponding event time to the request time, so that the client device emphasizes a first event with a first event time relative to a second event with a second event time when a time difference between the first event time and the request time is smaller than a time difference between the second event time and the request time.

2. The computer implemented method of claim 1, further comprising:
accessing an Internet source that includes event data;
parsing the event data for the event date and the event start and end time and one or more of the event name, the event summary, and the event venue name; and
storing the parsed event data in an event database.

3. The computer implemented method of claim 1, wherein the structured Internet data source includes one or more of microformat data and a data feed.

4. The computer implemented method of claim 1, wherein the request parameters further include one or more of user demographic information and a user preference data.

5. The computer implemented method of claim 4, further comprising determining that event data for one of the plurality of identified events corresponds to an event associated with a contact linked to one or more of the user demographic information and the user preference data.

6. The computer implemented method of claim 1, wherein event type for one of the plurality of identified events includes one or more of a public or private event, a performance, a sale event, product demonstration, a news event, a weather condition, and a hazard condition.

7. The computer implemented method of claim 1, wherein identifying the plurality of events with event times that occur within the threshold time of the request time includes:
broadening initial threshold time in response to determining that no events in the event database include an event time within the initial threshold time of the request time.

8. A computer-implemented method for displaying real-time event data within a map that is displayed by a client computing device, the method comprising:
sending, to a network server via a computer network, a request for mapping data including a request location defining a current geographic location of the client computing device and a request time, the request time including a time that the mapping data request is sent;
receiving, from the network server at the client computing device, mapping data and event data in response to the request for mapping data, the event data defining a plurality of events having event times delimited by corresponding start times and end times, that occur within a threshold time of the request time, and the mapping data for generating a digital map corresponding to the request location, wherein a database accessible to the network server stores an event start time and an event end time for each of the plurality of events; and displaying, at the client computing device, (i) the digital map within a viewport of a mapping application executing on the client computing device and (ii) indicators for the plurality of events on the digital map, including displaying the indicators differently depending on the proximity of the corresponding event time to the request time, including emphasizing a first event with a first event time relative to a second event with a second event time when a time difference between the first event time and the request time is smaller than a time difference between the second event time and the request time.

9. The computer implemented method of claim 8, wherein the event data originates from an Internet Source including one or more of microformat data and a data feed.

10. The computer implemented method of claim 8, wherein event type for one of the plurality of identified events includes one or more of a public or private event, a performance, a sale event, product demonstration, a news event, a temporal business event, a weather condition, a hazard condition, a natural disaster event, a power outage and a disease outbreak.

11. The computer implemented method of claim 8, wherein event data for one of the plurality of identified events further includes one or more of an event description, an event keyword, an event cost, an event phone number, and an event URL.

12. A computer system for displaying an event within visual proximity of a location on a digital map, the system comprising:
an event data server including one or more processors and a memory, the memory including instructions for execution on the one or more processors to:
receive, via a computer network, a request for mapping data including a request location defining a current geographic location of the client computing device,
determine a request time corresponding to the request, the request time based on a time the mapping data request was sent by the client computing device,
retrieve mapping data for generating a digital map corresponding to the request location,
identify, within an event database that stores event start times and event end times for events, a plurality of events with event times delimited by the corresponding start times and end times, that occur within a threshold time of the request time,
for each of the plurality of identified events, retrieve event data for the corresponding events from the event database,
send, via the computer network, the retrieved mapping data and the retrieved event data to the client computing device in response to the received request for mapping data; and
cause the client computing device to display indicators for the identified events on the digital map differently depending on the proximity of the corresponding event time to the request time, so that the client device emphasizes a first event with a first event time relative to a second event with a second event time when a time difference between the first event time and the request time is smaller than a time difference between the second event time and the request time.

13. The computer system of claim 12, wherein the Internet source includes one or more of microformat data and a data feed and the request parameters further include one or more of a user demographic information and a user preference.

14. The computer system of claim 12, wherein the determined event data for one of the plurality of identified events includes an event type including one or more of a public or private event, a performance, a sale event, product demonstration, a news event, a weather condition, a temporal business event, a hazard condition, a natural disaster event, a power outage, and a disease outbreak.

15. The computer system of claim 12, wherein to identify the plurality of events with event times that occur within the threshold time of the request time, the mapping server further includes instructions to:
   broaden, using the event data server, initial threshold time in response to determining that no events in the event database include an event time within the initial threshold time of the request time.

16. A computer-implemented system for displaying an event occurring at a location within a map that is displayed on a client computing device, the system comprising:
   a client computing device in communication with a mapping server, the client computing device including one or more processors and a memory, the memory storing instructions to:
      send, to a network server via a computer network, a request for mapping data including a request location defining a current geographic location of the client computing device and a request time, the request time including a time that the mapping data request is sent;
      receive, from the network server at the client computing device, mapping data and event data in response to the request for mapping data, the event data defining a plurality of events having event times delimited by the corresponding start times and end times, that occur within a threshold time of the request time, and the mapping data for generating a digital map corresponding to the request location, wherein a database accessible to the network server stores an event start time and an event end time for each of the plurality of events; and
      display, at the client computing device, (i) the digital map within a viewport of a mapping application executing on the client computing device and (ii) indicators for the plurality of events on the digital map, including display the indicators differently depending on the proximity of the corresponding event time to the request time, including emphasize a first event with a first event time relative to a second event with a second event time when a time difference between the first event time and the request time is smaller than a time difference between the second event time and the request time.

17. The computer system of claim 16, wherein event data for one of the plurality of events includes an event data type including one or more of a public or private event, a performance, a sale event, product demonstration, a news event, a weather condition, and a hazard condition.

18. The computer system of claim 16, wherein event data for one of the plurality of events includes one or more of an event description, an event keyword, an event cost, an event phone number, and an event URL.

* * * * *